United States Patent
Qiao et al.

(10) Patent No.: US 8,108,401 B2
(45) Date of Patent: Jan. 31, 2012

(54) APPLYING VARIOUS HASH METHODS USED IN CONJUNCTION WITH A QUERY WITH A GROUP BY CLAUSE

(75) Inventors: Lin Qiao, San Jose, CA (US); Vijayshankar Raman, Sunnyvale, CA (US); Garret Frederick Swart, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 12/057,979

(22) Filed: Mar. 28, 2008

(65) Prior Publication Data

US 2009/0249023 A1 Oct. 1, 2009

(51) Int. Cl.
G06F 17/30 (2006.01)
G06F 7/00 (2006.01)
(52) U.S. Cl. .................... 707/747; 707/769
(58) Field of Classification Search .......... 711/216; 707/769; 395/600
See application file for complete search history.

(56) References Cited

U.S. PATENT DOCUMENTS

| | | | |
|---|---|---|---|
| 5,511,190 A * | 4/1996 | Sharma et al. ............ | 1/1 |
| 5,742,806 A * | 4/1998 | Reiner et al. ............. | 1/1 |
| 6,006,234 A | 12/1999 | Govindarajan et al. | |
| 6,018,738 A | 1/2000 | Breese et al. | |
| 6,049,630 A | 4/2000 | Wang et al. | |
| 6,161,105 A | 12/2000 | Keighan et al. | |
| 6,309,424 B1 | 10/2001 | Fallon | |
| 6,345,267 B1 * | 2/2002 | Lohman et al. ........... | 1/1 |
| 6,370,524 B1 * | 4/2002 | Witkowski ................ | 1/1 |
| 6,381,601 B1 | 4/2002 | Fujiwara et al. | |
| 6,661,839 B1 | 12/2003 | Ishida et al. | |
| 7,039,764 B1 | 5/2006 | Shetty et al. | |
| 7,111,094 B1 | 9/2006 | Liu et al. | |
| 7,239,754 B2 | 7/2007 | Akimoto et al. | |
| 7,251,648 B2 | 7/2007 | Chaudhuri et al. | |
| 7,339,501 B2 | 3/2008 | Ban et al. | |
| 7,466,742 B1 | 12/2008 | Srinivasan | |
| 7,711,736 B2 | 5/2010 | Levin | |
| 7,739,275 B2 | 6/2010 | Dubinko et al. | |

(Continued)

OTHER PUBLICATIONS

Larson, "Data Reduction by Partial Preaggregation," Proceedings of the 18th Int'l Conf. on Data Engineering, Feb. 26-Mar. 1, 2002, San Jose, CA, pp. 706-715.

Larsson, "The Context Trees of Block Sorting Compression," Proceedings of the IEEE Data Compression Conf., Snowbird, UT, Mar. 30-Apr. 1, 1998, 10pgs.

(Continued)

*Primary Examiner* — Usmaan Saeed
*Assistant Examiner* — Sabana Rahman
(74) *Attorney, Agent, or Firm* — IP Authority, LLC; Ramraj Soundararajan

(57) ABSTRACT

A novel method is described for applying various hash methods used in conjunction with a query with a Group By clause. A plurality of drawers are identified, wherein each of the drawers is made up of a collection of cells from a single partition of a Group By column and each of the drawers being defined for a specific query. A separate hash table is independently computed for each of the drawers and a hashing scheme (picked from among a plurality of hashing schemes) is independently applied for each of the drawers.

15 Claims, 4 Drawing Sheets

U.S. PATENT DOCUMENTS

| | | |
|---|---|---|
| 2003/0028509 A1* | 2/2003 | Sah et al. .................. 707/1 |
| 2005/0055367 A1 | 3/2005 | Vo et al. |
| 2005/0192994 A1 | 9/2005 | Caldwell et al. |
| 2006/0233257 A1 | 10/2006 | Keith et al. |
| 2006/0251330 A1 | 11/2006 | Toth et al. |
| 2007/0083531 A1 | 4/2007 | Hussain |
| 2007/0245119 A1 | 10/2007 | Hoppe |
| 2007/0271268 A1 | 11/2007 | Fontoura et al. |
| 2007/0294506 A1 | 12/2007 | Ross |
| 2008/0294676 A1 | 11/2008 | Faerber et al. |
| 2008/0294863 A1 | 11/2008 | Faerber et al. |
| 2010/0030796 A1 | 2/2010 | Netz et al. |

OTHER PUBLICATIONS

Huang et al., "Windowed Huffman Coding Algorithm with Size Adaptation," IEEE Proceedings-I, V140, N2, Apr. 1993, pp. 109-113.

"Effective INTER-Parallel Schemes for Compression/Decompression Speed-up," IBM TDB, V40, N4, Apr. 1997, pp. 157-165.

"Maximum Entropy Method of Data Encoding for Dictionaries and Texts," IBM TDB, V33, N6B, Nov. 1990, pp. 45-46.

* cited by examiner

APPLYING VARIOUS HASH METHODS USED IN CONJUNCTION WITH A QUERY WITH A GROUP BY CLAUSE

BACKGROUND OF THE INVENTION

1. Field of Invention

The present invention relates generally to the field of hashing. More specifically, the present invention is related to various hashing techniques for maintaining running aggregates based on the estimated number of distinct groups in a drawer.

2. Discussion of Related Art

Hashing has long been an important area, both in database research, and in other areas of computer science. There is a rich literature on perfect hashing (e.g., see the book by Cormen et al. entitled, "Introduction to Algorithms, Second Edition," and the paper to Czech et al. entitled, "An optimal algorithm for generating minimal perfect hash functions"), though databases have traditionally used variants of chained hashing. Recently, several researchers have investigated using cuckoo hashing, a dynamic collision-free technique, for query processing (e.g., see the paper to Pagh et al. entitled, "Cuckoo hashing," the paper to Zukowski et al. entitled, "Architecture-conscious hashing," and the paper to Ross entitled, "Efficient hash probes on modern processors"). However, none of the previously described hashing techniques apply precomputed perfect hash functions to grouped aggregation queries.

The following patents and patent publications provide a general background describing various hashing techniques, however, as mentioned above, they fail to apply a precomputed perfect hash function to grouped aggregation queries.

The U.S. patent publication to Kenneth Ross (2007/0294506) discloses a hash scheme for processors and particularly describes a variant of cuckoo hashing, which minimizes branch mispredictions.

The U.S. patent publication to Fonroura et al. (2007/0271268) discloses using a mapping table to lookup a token and also discloses using a minimal perfect hash table when the token values are sparse in the domain.

The U.S. patent publication to Hugues Hoppe (2007/0245119) describes how to construct a perfect hash table for sparse variable size data.

The U.S. patent publication to Daniar Hussain (2007/0083531) describes an approach to generate parameters in polynomial hash functions, run them against the whole dataset, and choose the one with lowest collision.

The U.S. Patent to Shetty et al. (U.S. Pat. No. 7,039,764) describes a method wherein a unique key is received and a hash is searched for a match to the unique key. Concurrently with searching the hash, a cache is searched for the match to the unique key and information regarding the unique key is obtained.

The U.S. Patent to Fujiwara et al. (U.S. Pat. No. 6,381,601) describes a hash method which involves multiple bitmaps to remove duplicates efficiently when there is a large portion of data appearing only once.

The U.S. patent to Govindarajan et al. (U.S. Pat. No. 6,006,234) describes access control using logical groups in database, where the described grouping is not the grouping in a query, but deal with logical grouping of database objects.

Whatever the precise merits, features, and advantages of the above cited references, none of them achieves or fulfills the purposes of the present invention.

SUMMARY OF THE INVENTION

The present invention provides for a computer based method for applying various hash methods used in conjunction with a query with a Group By clause, wherein the method comprises the steps of: (a) identifying a plurality of cells, each representing a combination of disparate attribute partitions belonging to different attributes of a database (wherein the disparate attribute partitions are formed based on partitioning a set of attribute values of each attribute among a plurality of attributes of a database); (b) identifying a plurality of drawers, each of the drawers comprising a collection of cells from a single partition of a Group By column, and each of the drawers being defined for a specific query; (c) independently computing a separate hash table for each of the drawers; and (d) independently applying a hashing scheme picked from among a plurality of hashing schemes for each of the drawers.

The present invention also provides for a computer based method for applying various hash methods used in conjunction with a query with a Group By clause, wherein the method comprises the steps of: (a) identifying a plurality of cells, each representing a combination of disparate attribute partitions belonging to different attributes of a database (wherein the disparate attribute partitions are formed based on partitioning a set of attribute values of each attribute among a plurality of attributes of a database); (b) identifying a plurality of drawers, each of the drawers comprising a collection of cells from a single partition of a Group By column, and each of the drawers being defined for a specific query; (c) independently computing a separate hash table for each of the drawers; and (d) independently applying any of the following hashing schemes: for single column Group Bys, using a hashing scheme that uses group codes as an index to the given drawer's hash table; for correlated Group Bys, using a pre-computed minimal perfect hash function, wherein the pre-computed minimal perfect hash function has as many buckets as number of groups in said given drawer; and for a chained hash table, using a linear probing hashing scheme using multiplicative hashing as a hashing function.

The present invention also provides for an article of manufacture comprising a computer usable medium having computer readable program code embodied therein which implements each of the above-mentioned methods.

DESCRIPTION OF THE PREFERRED EMBODIMENTS

Figure 1:
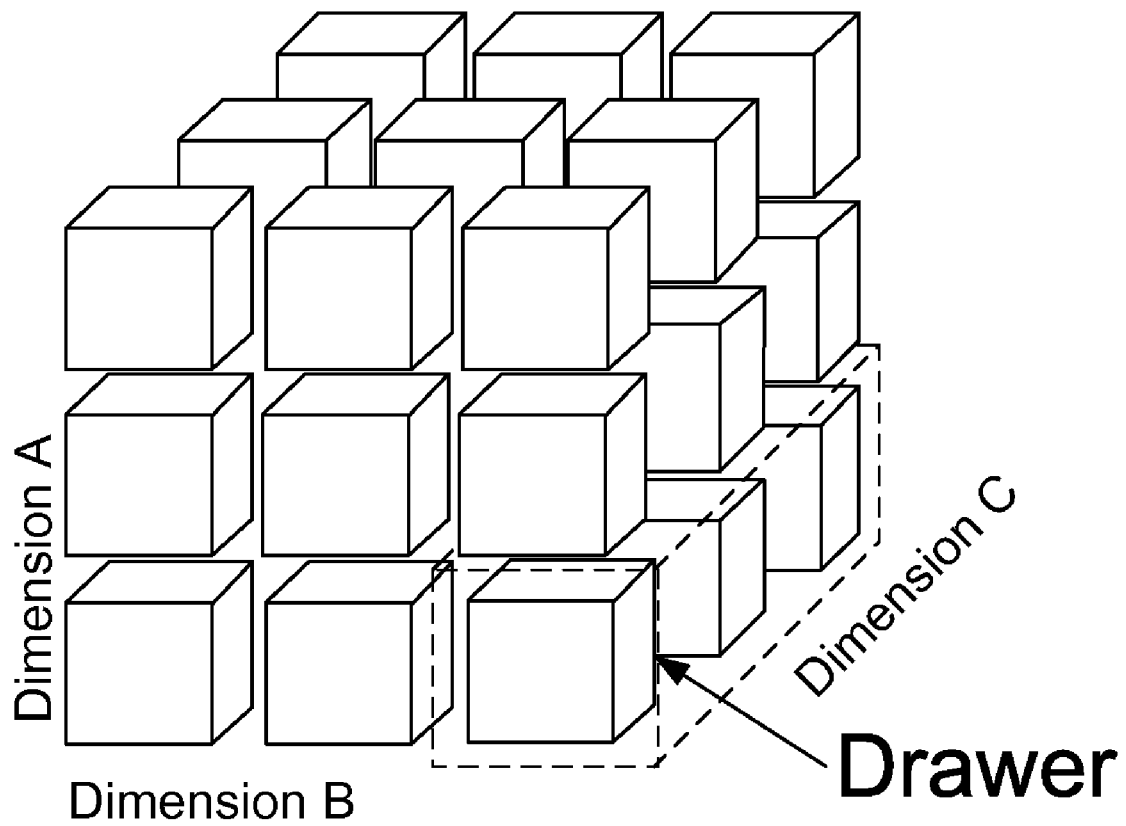
FIG. 1 shows a table that has been frequency partitioned on columns A, B, and C.

The paper by Raman et al. entitled, "Constant-Time Query Processing," to be published in the Proceedings of the $24^{th}$ IEEE International Conference on Data Engineering, held Apr. 7-12, 2008, in Cancún, Mexico, attached in Appendix A, provides additional details regarding a simplified database architecture that achieves constant time query processing.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The role of the grouping stage is to take pairs of group code and aggregate and use them to update a running aggregate for that group. Informally, the running aggregates are maintained in a hash table, so that this updating involves:

aggTable [hash (group)]+=aggregate for a suitably defined += operator. For instance, for COUNT, += is the numeric += and aggregate=1; for SUM, += is the numeric += and aggregate is the aggregate value; for MIN (or MAX), += is MIN (or MAX) of current aggTable[hash (group)] and the aggregate; for AVERAGE, there are two aggregation values maintained in aggTable, e.g., running SUM and COUNT, and aggregate is a vector of (aggregation value, 1).

There are two challenges in doing this efficiently:
the hash table needs to be kept concise so that it fits in the L2 cache; and
the hash table lookup needs to be efficient—in particular, random access and conditional branching involved in the usual open-chaining based hash tables needs to be avoided.

Three different hashing techniques are disclosed, which are applicable in different situations depending on the number of distinct groups.

Given that a query groups on columns G, H, which have column partitions G1, G2, H1, H2, the table might have numerous cells, from the cross-product of partitions on every column (not just G, H). There are then three granularities at which grouping can be done.

First, a separate aggTable is maintained for each cell. This results in a small aggTable because there will be few distinct groups in each cell. But the per cell hash tables need to be combined at the end to get the final result. Second, a single aggTable is maintained for the whole query. However, this results in a very large hash table (as many distinct groups as there are in the whole fact table), which may not fit in L2 cache. This approach is also hard to parallelize because all threads would have to synchronize on the hash table.

A third option lies between these extremes, called a drawer, which is defined by the partitioning along the Group By columns. A drawer is a collection of cells that come from a single partition of the Group By columns. FIG. 1 shows a table that has been frequency partitioned on columns A, B, and C. The dashed cuboid shows a drawer for a query that groups on A, B. In FIG. 1, each cube represents a cell; the dotted rectangular prism represents a single drawer for a query that groups on dimensions A and B. It should be noted that unlike cells, drawers are defined for a particular query.

Drawers have two important properties which make them the right granularity to compute aggTable's:
1. for all cells within a drawer, the codes for each grouping column are drawn from a single dictionary; since dictionaries are 1-to-1 maps of values to codes, the previously described updated now involves:

aggTable [hash (groupcode)]+=aggregate so the group code need not be decoded at this point.
2. each group can occur only in a single drawer—the aggTable can be drawer specific, and only needs to hold as many entries as there are groups in a single drawer—this is often much smaller than the total number of distinct groups in the table.

aggTable's are independently computed for each drawer. At the end, a union of the lists of (groupcode, aggregate) from each drawer is computed—since each group occurs in only one drawer, this is a trivial operation. Any HAVING clauses are then applied, and the groupcodes are then decoded.

Different drawers can have widely different numbers of groups because frequency partitioning partitions columns by frequency. Since a separate aggTable is used for each drawer, the hashing technique used for each drawer can be independently chosen according to its number of distinct groups, wherein such a number of distinct groups can be estimated from the dictionary.

Three kinds of hash tables are disclosed to maintain running aggregates based on the estimated number of distinct groups in the drawer: Group Code or Hash (IDX), Explicit Minimal Perfect Hash (MPH), and Linear Probing (LPB).

Group Code as Hash (IDX):

The first hashing technique involves using the group code itself as a hash function to index into a hash table, referred to as IDX. This hash function is trivial to compute. Further, since group codes are unique for each group, this hash function is guaranteed to be a perfect hash—i.e., have no collisions. So, the running aggregate can be accessed in a single lookup. For grouping on a single column, compression implies that the group code is very close to a minimal perfect hash—the smallest possible hash table that will handle all the distinct groups. So Blink uses IDX for all single-column Group Bys.

Explicit Minimal Perfect Hash (MPH):

The group code need not be dense for multi-column Group Bys, because of correlation. For example, a sales table with 1000 customers and 1000 stores could have CustId and StoreId columns, each coded in 10 bits. But, there may be many fewer than 10$^6$ distinct CustId, StoreId pairs, and it is cache-wasteful to use a 10$^6$ size hash table. Such correlated Group Bys are handled using an explicitly pre-computed minimal perfect hash (MPH) function. This MPH is constructed during the extract-transform-load phase, when all the group codes are seen (if new group codes arise based on incremental updates between loads, they are placed in a separate drawer that is handled by linear probing which is described later).

Since the Group By columns are not known in advance, MPHs are automatically constructed on all column-pairs that have sufficient correlation. It is envisioned that this construction can be further restricted to column-pairs that are used in the query workload. One perfect hash function is generated for each drawer for each chosen pair of Group By columns.

The perfect hash function is based on Jenkins's perfect hash as described in the Web Article entitled, "Minimal Perfect Hashing". Jenkin's hash function has exactly as many buckets as the number of groups. But, in addition to the hash table, Jenkin's hash function requires an auxiliary table to calculate the hash value, which usually has half the buckets of the hash table. Thus, for correlated columns, an MPH has many fewer buckets than would IDX, but each bucket is about twice as large as for IDX.

Another shortcoming of an MPH is that it needs two random lookups: one into the auxiliary table and then another into the actual aggregate table.

Linear Probing (LPB):

The linear probing (LPB) hash function uses open addressing over a chained hash table, as the linked list used in chained hash table has poor cache performance. Multiplicative hashing is used as the hash function. Although the hash function can be computed efficiently, LPB has collisions, which results in branches and associated branch misprediction penalty. Space-wise, LPB is quite expensive because it needs to store both group codes and aggregates. Moreover, the hash table can only be filled up to a load factor which must be around 60%, otherwise we will have too many collisions.

Figure 2:
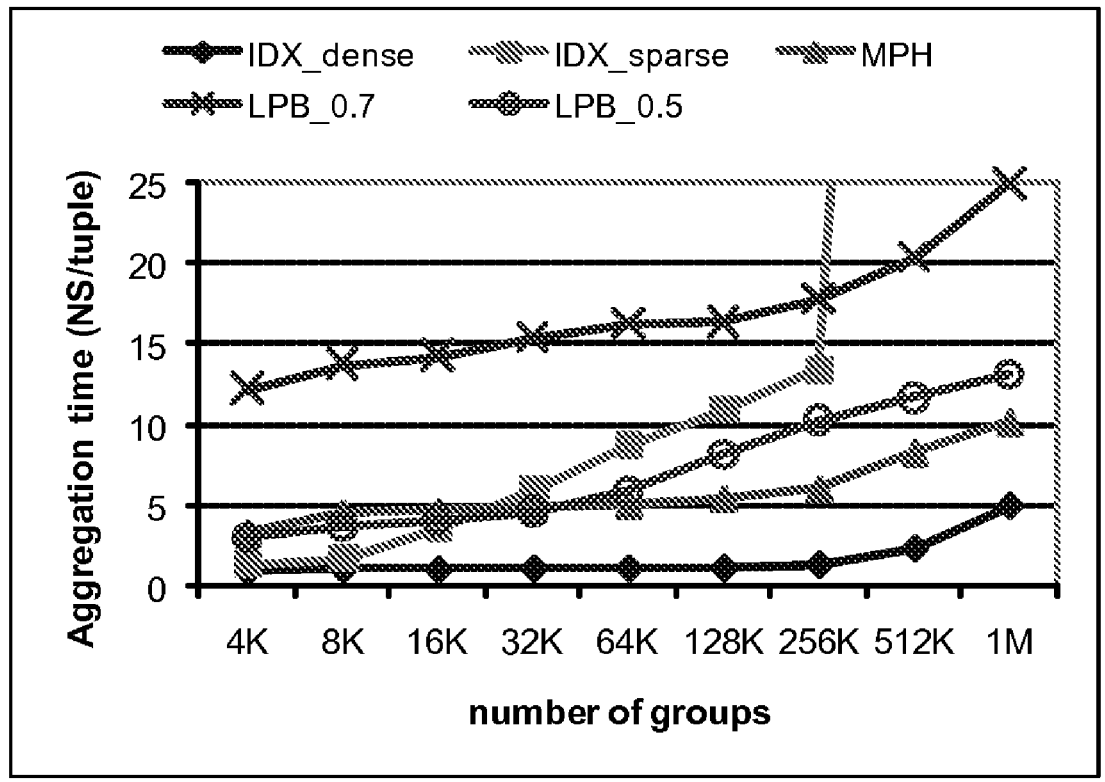
FIG. 2 illustrates a plot of the aggregation time for simple SUM with GROUPBY query as a function of the number of groups in the drawer.

A micro-benchmark was constructed to study the applicability of these three hash methods. FIG. 2 illustrates a plot of the aggregation time for simple SUM with GROUPBY query using each method, as a function of the number of groups in the drawer. Group codes are assigned to tuples at random, with each group code being equally likely. For IDX hash function, two cases are examined. The first (IDX_dense) is when the group code happens to be dense, which is defined as a group code domain that is only twice as large as the actual number of groups. The second (IDX_sparse) is when the groups are sparse, where the group code domain is set to be 1024 times of the number of groups. For LPB hash table, two load factors were studied: 0.7 (LPB 0.7) and 0.5 (LPB 0.5).

When the group code is dense, IDX is the best solution, because it has the smallest aggregation hash table, and requires only one lookup into it. In the sparse case, the aggregation time of MPH grows slower than of IDX_sparse because it has a smaller hash table. MPH outperforms IDX_sparse when there are more than 32,000 groups. Beyond about 256,000 groups the runtime of IDX_sparse increases, as its hash table (whose size is 1024 times the number of groups) starts to page out of memory.

These numbers indicate that one of IDX and MPH always dominates LPB: IDX for small numbers of groups and MPH for large numbers of groups. So LPB is used only as a fallback, for correlated multi-column Group Bys where we have not constructed an MPH. In such cases, an IDX hash table would spill out of cache, where as an LPB hash table can fit in cache because it is sized by the number of distinct groups.

As mentioned previously, the above-mentioned hashing techniques (i.e., the first technique that uses group value as the index to aggTable, the second technique using an explicit minimal perfect hash function, which has exactly as many buckets as the number of groups, and the third technique using open addressing with linear probing) are applicable in different situations. It should be noted that the present invention's hashing techniques are applicable in scenarios with and without compression. With compression, the Group By code can be used directly as hash index for single column grouping, while perfect hash functions are used for multiple column grouping. Without compression, IDX is chosen as the hash method for dense columns and MPH is chosen for sparse columns. LPB requires more space than IDX and MPH (and has branches), so it is used as fallback of MPH when the perfect hash function is not constructed for certain Group By columns.

Perfect hash functions are constructed during the extract-transform-load process, and are used to lookup hash table during runtime. The perfect hash function has exactly as many buckets as the number of groups and it completely avoids conditional branching for aggregation calculation during Group By stage.

Further, the granularity at which grouping needs to be done can be chosen. The grouping granularity directly affects the hash table size. If the hash table is too large, it may not stay in cache and a penalty is paid by way of cache misses. If the hash table is too small, there will be overhead associating with each hash table and the overall overhead will be large. So a balance is struck between these two extremes. In particular, the grouping unit is chosen based on the concept of a drawer. With frequency partitioning, per drawer hash table stays in between per query hash table and per cell hash table.

Figure 3:
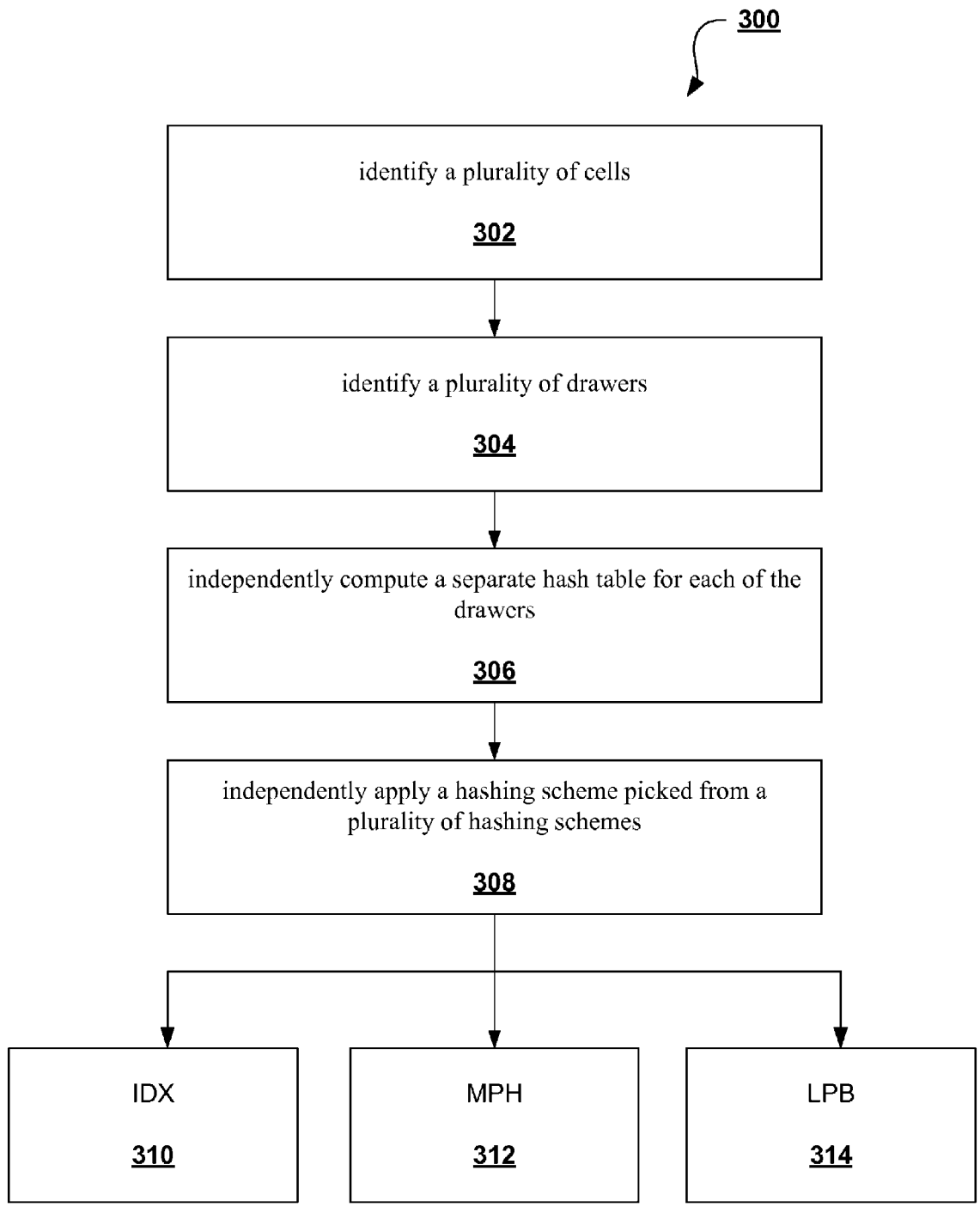
FIG. 3 illustrates one embodiment of the present invention's method for applying various hash methods used in conjunction with a query with a Group By clause.

FIG. 3 illustrates one embodiment of the present invention's method 300 for applying various hash methods used in conjunction with a query with a Group By clause. According to this embodiment, the method 300 comprises the steps of: (a) identifying a plurality of cells, each representing a combination of disparate attribute partitions belonging to different attributes of a database (wherein the disparate attribute partitions are formed based on partitioning a set of attribute values of each attribute among a plurality of attributes of a database)—step 302; (b) identifying a plurality of drawers, each of the drawers comprising a collection of cells from a single partition of a Group By column, and each of the drawers being defined for a specific query—step 304; (c) independently computing a separate hash table for each of the drawers—step 306; and (d) independently applying any of the following hashing schemes—step 308: for single column Group Bys, using an IDX hashing scheme that uses group codes as an index to the given drawer's hash table—step 310; for correlated Group Bys, using a pre-computed minimal perfect hash (MPH) function—step 312, wherein the pre-computed minimal perfect hash function has as many buckets as number of groups in said given drawer; and for a chained hash table, using a linear probing (LPB) hashing scheme using multiplicative hashing as a hashing function—step 314.

Additionally, the present invention provides for an article of manufacture comprising computer readable program code contained within implementing one or more modules to pick a hashing scheme from a plurality of hashing schemes used in conjunction with a query with a Group By clause. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) identifying a plurality of cells, each representing a combination of disparate attribute partitions belonging to different attributes of a database (wherein the disparate attribute partitions are formed based on partitioning a set of attribute values of each attribute among a plurality of attributes of a database), the identification of cells done via cell identifier 402 of FIG. 4; (b) identifying a plurality of drawers, each of the drawers comprising a collection of cells from a single partition of a Group By column, and each of the drawers being defined for a specific query, the identification of drawers done via drawer identifier 404 of FIG. 4; (c) independently computing a separate hash table for each of the drawers, the hash table computation done via hash table computation unit 406 of FIG. 4; and (d) independently applying a hashing scheme picked from among a plurality of hashing schemes for each of the drawers, the hash scheme picked via hash scheme picker 408 of FIG. 4.

Figure 4:
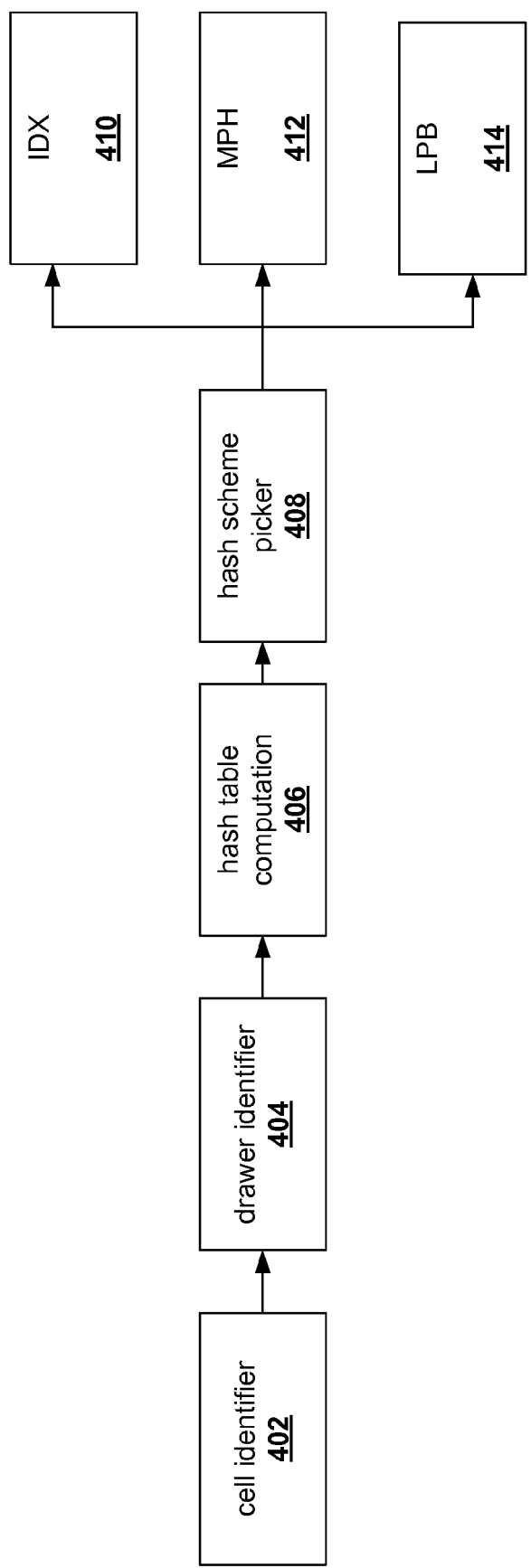
FIG. 4 illustrates a system for applying various hash methods used in conjunction with a query with a Group By clause.

Also implemented in computer program code based products are software modules for: (a) identifying a plurality of cells, each representing a combination of disparate attribute partitions belonging to different attributes of a database (wherein the disparate attribute partitions are formed based on partitioning a set of attribute values of each attribute among a plurality of attributes of a database), ), the identification of cells done via cell identifier 402 of FIG. 4; (b)

identifying a plurality of drawers, each of the drawers comprising a collection of cells from a single partition of a Group By column, and each of the drawers being defined for a specific query, the identification of drawers done via drawer identifier 404 of FIG. 4; (c) independently computing a separate hash table for each of the drawers, the hash table computation done via hash table computation unit 406 of FIG. 4; and (d) independently applying any of the following hashing schemes (the hash scheme picked via hash scheme picker 408 of FIG. 4): for single column Group Bys, using a hashing scheme (labeled IDX 410 in FIG. 4) that uses group codes as an index to the given drawer's hash table; for correlated Group Bys, using a pre-computed minimal perfect hash function (labeled MPH 412 in FIG. 4), wherein the pre-computed minimal perfect hash function has as many buckets as number of groups in said given drawer; and otherwise, using a linear probing hashing scheme (labeled LPB 414 in FIG. 4) using multiplicative hashing as a hashing function.

The invention claimed is:

1. A computer-based method to apply a plurality of hash methods in a query with a Group By clause comprising:
   identifying a plurality of cells, each of said cells representing a combination of disparate attribute partitions, said disparate attribute partitions formed based on partitioning a set of attribute values of each attribute among a plurality of attributes of a database, and said disparate partitions belonging to different attributes of said database;
   identifying a plurality of drawers, each of said drawers comprising a collection of cells from a single partition of a Group By column, and each of said drawers being defined for a specific query;
   independently computing a separate hash table for each of said drawers; and
      independently applying a hashing scheme picked from among a plurality of hashing schemes for each of said drawers, wherein, said hashing scheme is picked according to the number of distinct groups in said given drawer, said number of distinct groups estimated from a dictionary, said hashing scheme is picked from said plurality of hashing schemes as follows:
      for single column Group Bys, using a hashing scheme that uses group codes as an index to said given drawer's hash table;
      for correlated Group Bys, using a pre-computed minimal perfect hash function, said pre-computed minimal perfect hash function having as many buckets as number of groups in said given drawer; and
      otherwise, using a linear probing hashing scheme using multiplicative hashing as a hashing function,
      wherein when said linear probing hashing scheme is picked, said method comprising the step of filling a hash table associated with said give drawer up to a predetermined load factor.

2. The computer-based method of claim 1, wherein said pre-computed minimal perfect hash function is constructed by computer readable program code during extract-transform-load operations.

3. The computer-based method of claim 1, wherein, when said pre-computed minimal perfect hash function is used, computer readable program code maintains an auxiliary table for computing hash values.

4. The computer-based method claim 1, wherein when said load factor is about 60%.

5. The computer-based method claim 1, wherein said liner probing technique is picked only as a fall-back for correlated multi-column Group Bys when said minimal perfect hash function is not pre-computed.

6. An article of manufacture comprising a non-transitory computer usable storage medium having computer readable program code embodied therein which implements a computer-based method for applying a plurality of hash methods in query with a Group By clause, said computer usable medium comprising:
   computer readable program code identifying a plurality of cells, each of said cells representing a combination of disparate attribute partitions, said disparate attribute partitions formed based on partitioning a set of attribute values of each attribute among a plurality of attributes of a database, and said disparate partitions belonging to different attributes of said database; computer readable program code identifying a plurality of drawers, each of said drawers comprising a collection of cells from a single partition of a Group By column, and each of said drawers being defined for a specific query; computer readable program code independently computing a separate hash table for each of said drawers; and
   computer readable program code independently applying a hashing scheme picked from among a plurality of hashing schemes for each of said drawers wherein, said hashing scheme is picked according to the number of distinct groups in said given drawer, said number of distinct groups estimated from a dictionary, said hashing scheme is picked from said plurality of hashing schemes as follows:
      for single column Group Bys, using a hashing scheme that uses group codes as an index to said given drawer's hash table;
      for correlated Group Bys, using a pre-computed minimal perfect hash function, said pre-computed minimal perfect hash function having as many buckets as number of groups in said given drawer; and
      otherwise, using a linear probing hashing scheme using multiplicative hashing as a hashing function,
      wherein when said linear probing hashing scheme is picked, said method comprising the step of filling a hash table associated with said give drawer up to a predetermined load factor.

7. The article of manufacture of claim 6, wherein said pre-computed minimal perfect hash function is constructed by computer readable program code during extract-transform-load operations.

8. The article of manufacture of claim 6, wherein, when said pre-computed minimal perfect hash function is used, computer readable program code maintains an auxiliary table for computing hash values.

9. The article of manufacture of claim 6, wherein when said load factor is about 60%.

10. The article of manufacture of claim 6, wherein computer readable program code picks said linear probing technique only as a fall-back for correlated multi-column Group Bys when said minimal perfect hash function is not pre-computed.

11. A computer-based method to apply a plurality of hash methods in a query with a Group By clause comprising:
   identifying a plurality of cells, each of said cells representing a combination of disparate attribute partitions, said disparate attribute partitions formed based on partitioning a set of attribute values of each attribute among a plurality of attributes of a database, and said disparate partitions belonging to different attributes of said database;

identifying a plurality of drawers, each of said drawers comprising a collection of cells from a single partition of a Group By column, and each of said drawers being defined for a specific query;

independently computing a separate hash table for each of said drawers;

independently applying any of the following hashing schemes:

for single column Group Bys, using a hashing scheme that uses group codes as an index to said given drawer's hash table;

for correlated Group Bys, using a pre-computed minimal perfect hash function, said pre-computed minimal perfect hash function having as many buckets as number of groups in said given drawer; and otherwise, using a linear probing hashing scheme using multiplicative hashing as a hashing function, wherein when said linear probing hashing scheme is picked, said method comprising the step of filling a hash table associated with said give drawer up to a predetermined load factor; and wherein, for a given drawer, a hashing scheme is picked according to the number of distinct groups in said given drawer, said number of distinct groups estimated from a dictionary.

12. The computer-based method of claim 11, wherein said pre-computed minimal perfect hash function is constructed during extract-transform-load operations.

13. The computer-based method of claim 11, wherein said pre-computed minimal perfect hash function maintains an auxiliary table for computing hash values.

14. The computer-based method of claim 11, wherein when said load factor is about 60%.

15. The computer-based method of claim 11, wherein said linear probing technique is picked only as a fall-back for correlated multi-column Group Bys when said minimal perfect hash function is not pre-computed.

* * * * *